US008759656B1

(12) United States Patent
Kumar

(10) Patent No.: US 8,759,656 B1
(45) Date of Patent: Jun. 24, 2014

(54) GAME FOR LEARNING MUSIC FUNDAMENTALS THROUGH VISUALIZATION

(76) Inventor: Sai Kumar, Richardson, TX (US)

(*) Notice: Subject to any disclaimer, the term of this patent is extended or adjusted under 35 U.S.C. 154(b) by 54 days.

(21) Appl. No.: 13/571,251

(22) Filed: Aug. 9, 2012

(51) Int. Cl.
*G09B 15/00* (2006.01)
(52) U.S. Cl.
USPC ........................................ 84/470 R
(58) Field of Classification Search
USPC ........................................ 84/470 R
See application file for complete search history.

(56) References Cited

U.S. PATENT DOCUMENTS

| | | | | |
|---|---|---|---|---|
| 1,099,372 A * | 6/1914 | Hughes | 84/471 R |
| 1,945,398 A * | 1/1934 | Gregg | 84/471 R |
| 2,447,213 A * | 8/1948 | Sledge | 84/470 R |
| 3,530,758 A * | 9/1970 | Stillo | 84/471 R |
| 3,715,951 A * | 2/1973 | Lanaro | 84/470 R |
| 3,733,957 A * | 5/1973 | Peirano et al. | 84/471 R |
| 4,056,999 A * | 11/1977 | Bennett | 84/479 R |
| 4,236,714 A * | 12/1980 | Locke | 273/238 |
| 4,464,971 A * | 8/1984 | Dean | 84/471 R |
| 4,819,539 A * | 4/1989 | Searing | 84/476 |
| 4,832,605 A * | 5/1989 | Bragin | 434/168 |
| 5,249,808 A * | 10/1993 | Batte | 273/249 |
| 5,275,567 A * | 1/1994 | Whitfield | 434/113 |
| 6,086,378 A * | 7/2000 | Johnson | 434/128 |
| 6,111,180 A * | 8/2000 | DiGiulio | 84/471 R |
| 6,175,069 B1 * | 1/2001 | Longacre | 84/476 |
| 6,271,453 B1 * | 8/2001 | Hacker | 84/476 |
| 6,826,784 B2 * | 12/2004 | Patire | 2/433 |
| 6,967,274 B2 * | 11/2005 | Hanington | 84/476 |
| 7,396,988 B1 * | 7/2008 | Rowe | 84/476 |
| 7,687,702 B2 * | 3/2010 | Chu | 84/476 |
| 7,754,954 B2 * | 7/2010 | Neil | 84/470 R |
| 7,956,271 B1 * | 6/2011 | Jonas | 84/476 |
| 8,020,870 B2 * | 9/2011 | Robuck, Jr. | 273/271 |
| 8,106,280 B2 * | 1/2012 | Midkiff | 84/470 R |
| 2009/0142738 A1 * | 6/2009 | Suganuma | 434/191 |

OTHER PUBLICATIONS

Blind Spell by MindWare, posted Mar. 15, 2012 by sherry, viewed Nov. 26, 2013 at playonwords.com/award/2012/03/15/blind-spell-by-mindware/.*

* cited by examiner

*Primary Examiner* — Robert W Horn

(57) ABSTRACT

A game facilitating teaching of music reading and learning in a fun way includes a pair of blinding glasses which completely deprive a wearer of sight, seven cubes having a magnet at their centers and engraved musical notes on some of their sides. A musical staff having palpable lines and spaces allowing for the receipt of a plurality of staff note pieces to designate musical scales or chords. A timing device offers the possibility of increasing the difficulty of game play by limiting the amount of time a participant has to complete an arrangement of game pieces.

11 Claims, 2 Drawing Sheets

GAME FOR LEARNING MUSIC FUNDAMENTALS THROUGH VISUALIZATION

BACKGROUND OF THE INVENTION

Many music students find learning music fundamentals and reading sheet music to be a painful part of their musical journeys. Sheet music patterns such as notes, chords and scale as well as music theory are notoriously difficult to remember. Finding motivation to put effort into solidifying these fundamentals is difficult since the learning process is generally not considered fun.

SUMMARY OF THE INVENTION

The present invention makes the music learning process a fun game. By taking away a participant's vision, the participant must focus on touch as a sensory input for imagination. By locking in mental imagery to sheet music and theory, aspiring musicians are able to retain and solidify all fundamentals. The game enables aspiring musicians to mentally imagine a note, chord or scale and arrange a manifestation of it. This involves both sheet music representation and the individual notes that are part of it.

DETAILED DESCRIPTION OF THE INVENTION

In accordance with an embodiment of the present invention, a game is provided which improves the music reading ability of one or more players who participate in playing the game.

Figure 1:
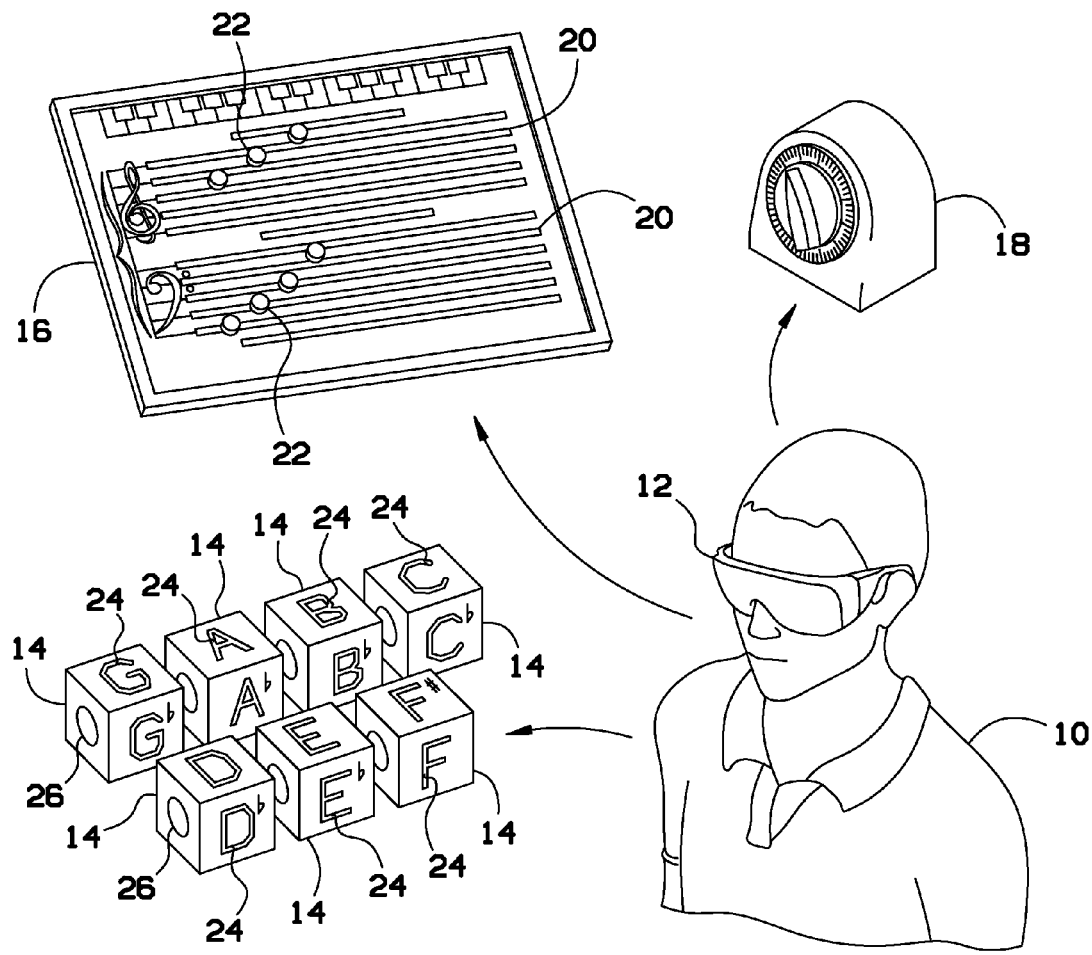
FIG. 1 illustrates an exemplary game system in accordance with an embodiment of the present invention.

In one aspect of the present invention depicted by way of example in FIG. 1, seven blocks 14 are provided each having six sides. On some of the six sides, indicia 24 representing musical notes is formed such that a user may be capable of identifying the indicia by use of sense of touch, for example, by fingers, fingertips or hands. As depicted in FIG. 1 according to a preferred embodiment, each block 14 may include indicia pertaining to three musical notes separated by half-steps within the chromatic scale and each pair of notes separated by half-steps may be located on adjacent sides. For example, Aβ is formed on a side adjacent to A is formed on a side adjacent to A#. Among the blocks 14, a participant would be able to select any possible musical note from the chromatic scale. In addition to individual notes, some sides of blocks 14 may include indicia representative of minor or major chords which may be formed from musical notes of a given scale. For example, a block including Aβ, A and A# indicia also includes one or more of Am, Aβm, A#m and A7 chords. Thus, the game facilitates a large number of musical permutations and combinations.

In some embodiments, the indicia may be palpable due to being engraved into the surface of the sides while in other embodiments, the indicia could be raised above the surface of the sides.

Magnets 26 are embedded within the blocks 14 to cause blocks 14 to be attracted to one another when in close proximity and subsequently held together. In this way, a number of blocks 14 may be connected together in a row to depict a series of musical notes which may, for example, represent a musical scale or chord.

In another aspect of the present invention, also depicted by way of example in FIG. 1, a musical staff board 16 includes a front surface upon which is formed musical staff indicia comprising both treble and bass clefs each having a number of lines 20 and a number of spaces as is typical with musical staffs. Similar to blocks 14, lines 20, the spaces between lines 20 or both are palpable by a user such as by fingers, fingertips or hands. In a preferred embodiment, lines 20 are raised above the front surface of staff board 16 which then results in the spaces effectively resembling depressions relative to lines 20 which are therefore also palpable.

Lines 20 are preferably magnetized to receive magnetic or metallic music note pieces 22. An arrangement of one or more music note pieces 22 upon musical staff board 16 may be representative of a musical scale or chord. In some embodiments, lines 20 may be metal while the music note pieces 22 are magnetized.

In yet another aspect of the present invention, also depicted by way of example in FIG. 1, a timer 18 is provided to count down from a time set by a user. While depicted as a typical rotatable dial timer such as those used in kitchens, the timer may be of a variety of forms including but not limited to an hourglass or a stopwatch. In some embodiments, timing may be provided by a person counting down from an established number.

In a final aspect of the present invention, also depicted by way of example in FIG. 1, a pair of blinding glasses 12 is provided to be worn by a user of the game of the present invention. Blinding glasses 12 are provided with lenses which completely prevent a wearer from seeing. As such, the wearer is required to identify palpable indicia such as that provided on the sides of cube blocks 14 by use of touch sensation of the fingers, fingertips or hands as mentioned above. Glasses 12 are formed in a wrap-around style to prevent any use of wearer peripheral vision.

In some embodiments, blinding glasses 12 may be replaced by a blindfold or other device for preventing a wearer from seeing and to thereby require the wearer to make use of their sense of touch.

Figure 2:
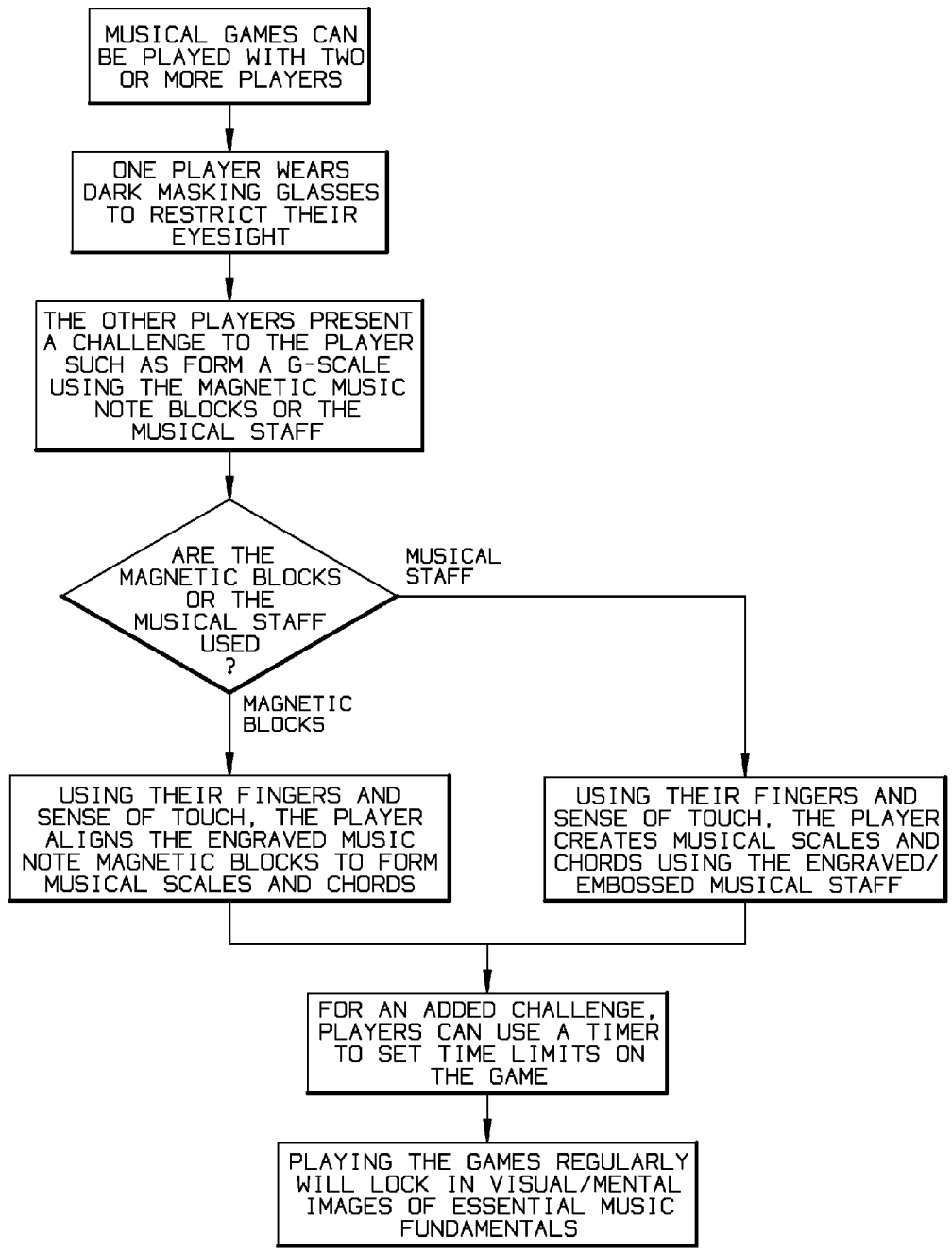
FIG. 2 illustrates a flow diagram of an exemplary method of playing a game in accordance with an embodiment of the present invention.

In accordance with a preferred embodiment of use of the game of the present invention as depicted in FIG. 2, a first game participant dons blinding glasses 12 to prevent them from using their sense of sight. Next, a second participant, presents a challenge to the wearer of the blinding glasses to demonstrate a particular musical scale or musical chord.

If the participants have agreed to play the game with the magnetic blocks 14, blinded participant 10 determines which musical notes are required to form the recited musical chord or musical scale and then chooses the corresponding magnetic blocks by use of their sense of touch. Upon selection of one or more of the corresponding magnetic blocks, the blinded participant arranges magnetic blocks 14 into the configuration representative of the recited musical scale or chord by placing the magnetic blocks into close enough proximity with one another such that magnets 26 attract each other to cause an engagement of adjacent blocks 14 to one another. After selection and assembly of all blocks necessary to form the recited scale or chord, one or more game participants or an unbiased game master will review the assembly of blocks to determine if the arrangement accurately depicts the requested musical scale or chord. Some number of points may then be awarded to the player who correctly forms the musical scale or chord.

To provide extra challenge to the blinded participant, timer 18 may be set to an established time. With timer 18 set, the blinded participant 10 is required to assemble the appropriate blocks 14 before expiration of the established time as indicated by an alert from timer 18. As the chord- or scale-forming skills of participant 10 improve, the time set on timer 18 may be decreased to increase the level of difficulty of game play.

If participants have agreed to play the game with musical staff 16, blinded participant 10 determines which musical notes are required to form the recited musical chord or musical scale. Having established the required musical notes, participant 10 uses their sense of touch to select lines 20 or the spaces on staff 16 which are representative of the required notes and places notes 22 at the appropriate lines 20 or the spaces to form the recited musical scale or chord. Upon placing all the notes participant 10 believes are necessary to form the musical scale or chord, one or more game participants or an unbiased game master will review the assembly of blocks to determine if the arrangement accurately depicts the requested musical scale or chord. Some number of points may then be awarded to the player who correctly forms the musical scale or chord.

As above with magnetic blocks 14, in order to provide extra challenge to the blinded participant 10, timer 18 may be set to an established time. With timer 18 set, the blinded participant 10 is required to assemble the appropriate blocks 14 before expiration of the established time as indicated by an alert from timer 18. As the chord- or scale-forming skills of participant 10 improve, the time set on timer 18 may be decreased to increase the level of difficulty of game play.

To facilitate training the "musical ear" of a music student, in some embodiments of a method of playing the game, a scale or chord may be played for the blinded participant 10 rather than simply recited by speech. This approach would be applicable with either the magnetic blocks 14 or the musical staff board 16.

While the game described above makes use of blinding glasses 12 to require a blinded participant to use their sense of touch to assemble game pieces 14, 16 and 22 into musical scales or chords, it should be appreciated that blinding glasses 12 may be used in a variety of other applications. Such applications may include but are not limited to puzzles, construction toys, basketball, Baggo™ or darts. In some of these applications, an audible beacon may be provided to encourage the participant to focus on their sense of hearing. For example, a dart board emits a sound to allow a vision-deprived participant to locate the board by their sense of hearing and propel the dart towards the sound.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A game for teaching music theory and retention of music fundamentals via visualization, said game comprising:
   a pair of blinding glasses which completely prevents or deprives a wearer of sight;
   a plurality of blocks configured to form a plurality of musical notes, each block comprising six sides and a magnet that engages the block with another adjacently arranged block, wherein each side of a set of sides in the six sides comprises palpable musical notation indicia comprising at least one of musical notes and musical chords, said palpable musical notation indicia providing touch sensation to teach the wearer of the blinding glasses the musical notation;
   a musical staff having palpable lines and spaces;
   a plurality of magnetic staff note pieces receivable on the lines and within the spaces of the musical staff; and
   a timer.

2. The game as set forth in claim 1, wherein the set of sides comprises three of the six sides, said indicia representing musical notes comprising indicia for one natural, one sharp, and one flat note.

3. The game as set forth in claim 1, wherein the indicia representing musical notes is raised above the surfaces of the sides of the blocks.

4. The game as set forth in claim 1, wherein the indicia is engraved into sides of the blocks.

5. The game as set forth in claim 1, wherein the lines of the musical staff are raised above a surface of the musical staff.

6. A method for making a game that teaches music theory via touch sensation that allows visualization of music notation indicia for the retention of music fundamentals, said method comprising:
   forming music notation indicia on a set of sides of each block of a plurality of six-sided blocks, said music notation indicia palpable by touch sensation to a game user wearing a blinding device that prevents the user from seeing;
   forming musical staff indicia on a surface of a staff board, said musical staff indicia palpable by touch sensation to the user wearing the blinding device, said musical staff indicia comprising a plurality of lines, each line separated from other lines by at least one space;
   magnetizing a plurality of staff note pieces for engagement on the lines and spaces of the staff board to recite a musical scale; and
   embedding at least one magnet in each block in the plurality of six-sided blocks, wherein each block is magnetically engaged to another block when the blocks are placed in close proximity adjacent to each other, said blocks placed by the user in close proximity to represent the recited musical scale.

7. The method of claim 6, wherein forming music notation indicia comprises engraving musical notation on the set of sides.

8. The method of claim 6, wherein forming music notation indicia comprises raising musical notation above the surface of each side in the set of sides.

9. The method of claim 6, wherein forming musical staff indicia comprises raising the plurality of lines above the surface of the staff board.

10. The method of claim 9, wherein forming musical staff indicia comprises metalicizing the plurality of lines raised above the surface of the staff board.

11. The method of claim 6, wherein forming musical staff indicia comprises engraving the plurality of lines on the surface of the staff board.

* * * * *